United States Patent [19]

Nower

[11] Patent Number: 5,715,609

[45] Date of Patent: Feb. 10, 1998

[54] STATIONARY SHAFT ALIGNMENT APPARATUS

[75] Inventor: Daniel L. Nower, Knoxville, Tenn.

[73] Assignee: CSI Technology, Inc., Wilmington, Del.

[21] Appl. No.: 648,403

[22] Filed: May 15, 1996

[51] Int. Cl.⁶ ........................................... G01B 11/27
[52] U.S. Cl. ........................................... 33/645; 33/412
[58] Field of Search ........................... 33/286, 412, 520, 33/533, 613, 645, 655, DIG. 21

[56] References Cited

U.S. PATENT DOCUMENTS

| | | | |
|---|---|---|---|
| 4,115,925 | 9/1978 | Malak | 33/661 |
| 4,161,068 | 7/1979 | McMaster | 33/645 |
| 4,244,111 | 1/1981 | Heard, Sr. | 33/412 |
| 4,367,594 | 1/1983 | Murray, Jr. | 33/412 |
| 4,428,126 | 1/1984 | Banks | 33/412 |
| 4,451,992 | 6/1984 | Malak | 33/412 |
| 4,553,335 | 11/1985 | Woyton | 33/645 |
| 4,586,264 | 5/1986 | Zatezalo | 33/412 |
| 4,964,224 | 10/1990 | Jackson | 33/645 |
| 5,056,237 | 10/1991 | Saunders | 33/645 |
| 5,185,937 | 2/1993 | Piety et al. | 33/645 |
| 5,222,306 | 6/1993 | Neumann | 33/645 |
| 5,371,953 | 12/1994 | Nower et al. | 33/645 |

FOREIGN PATENT DOCUMENTS

| | | | |
|---|---|---|---|
| 305345 | 6/1979 | U.S.S.R. | 33/645 |
| WO87/01439 | 3/1987 | WIPO | 33/412 |

OTHER PUBLICATIONS

Article: "Aligning Shafts Part 1—Measuring Misalignment", Durkin, *Plant Engineering*, Jan. 11, 1979, pp. 86–90.

Article: "Aligning Shafts Part 2—Correcting Misalignment", Durkin, *Plant Engineering*, Jan. 11, 1979, pp. 102–105.

*Primary Examiner*—G. Bradley Bennett
*Attorney, Agent, or Firm*—Luedeka, Neely & Graham

[57] ABSTRACT

The specification discloses apparatus for aligning stationary in-line machine shafts. In a preferred embodiment, the invention provides an alignment system having a sensed point rotatably positionable around a shaft for rotation through a plurality of angular positions around the shaft to provide a reference point against which misalignment is measured. The position of the sensed point is sensed by a sensor which is rotatably positionable around the shaft independently of the sensed point for rotation through a plurality of angular positions about the shaft.

17 Claims, 6 Drawing Sheets

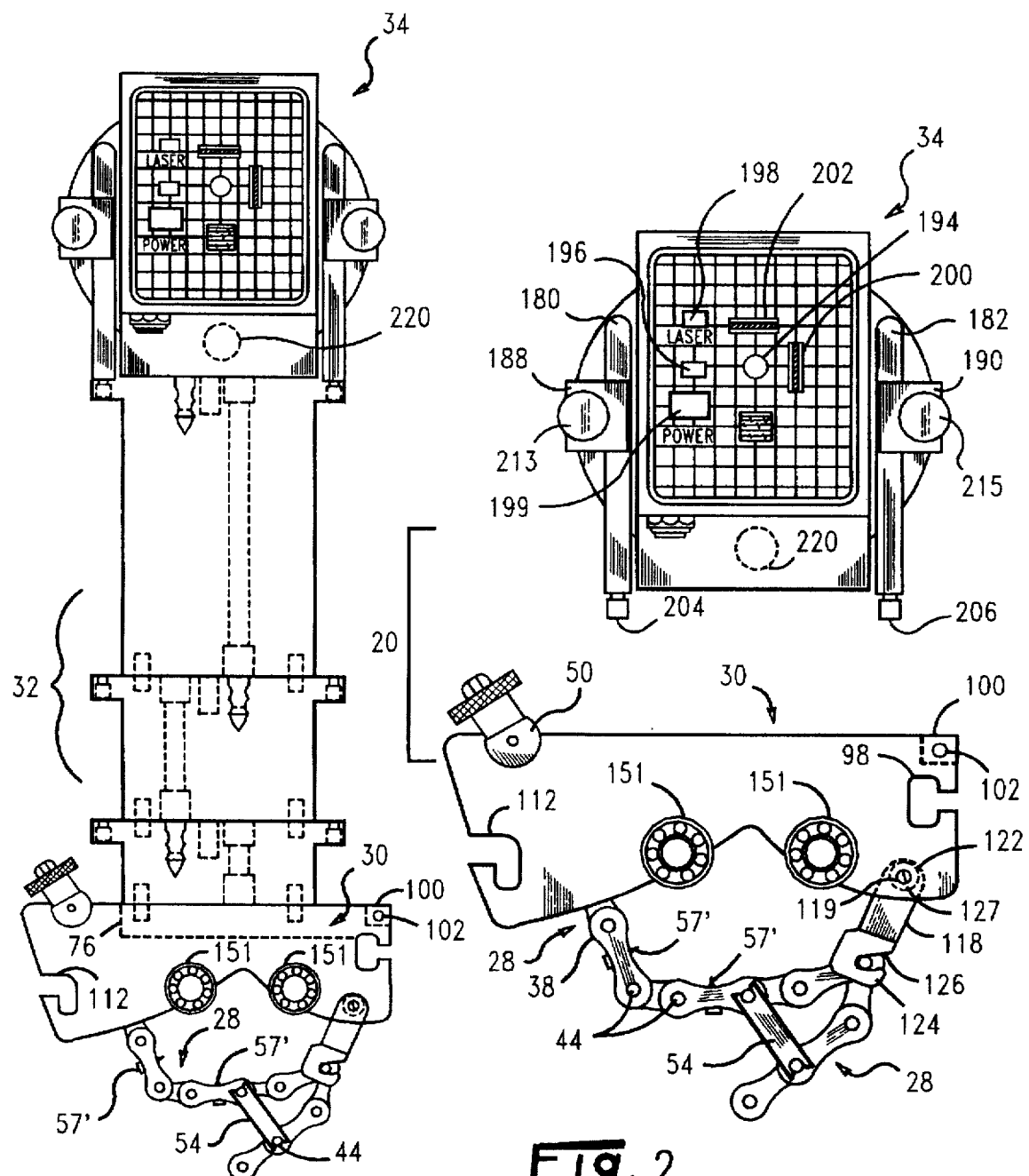

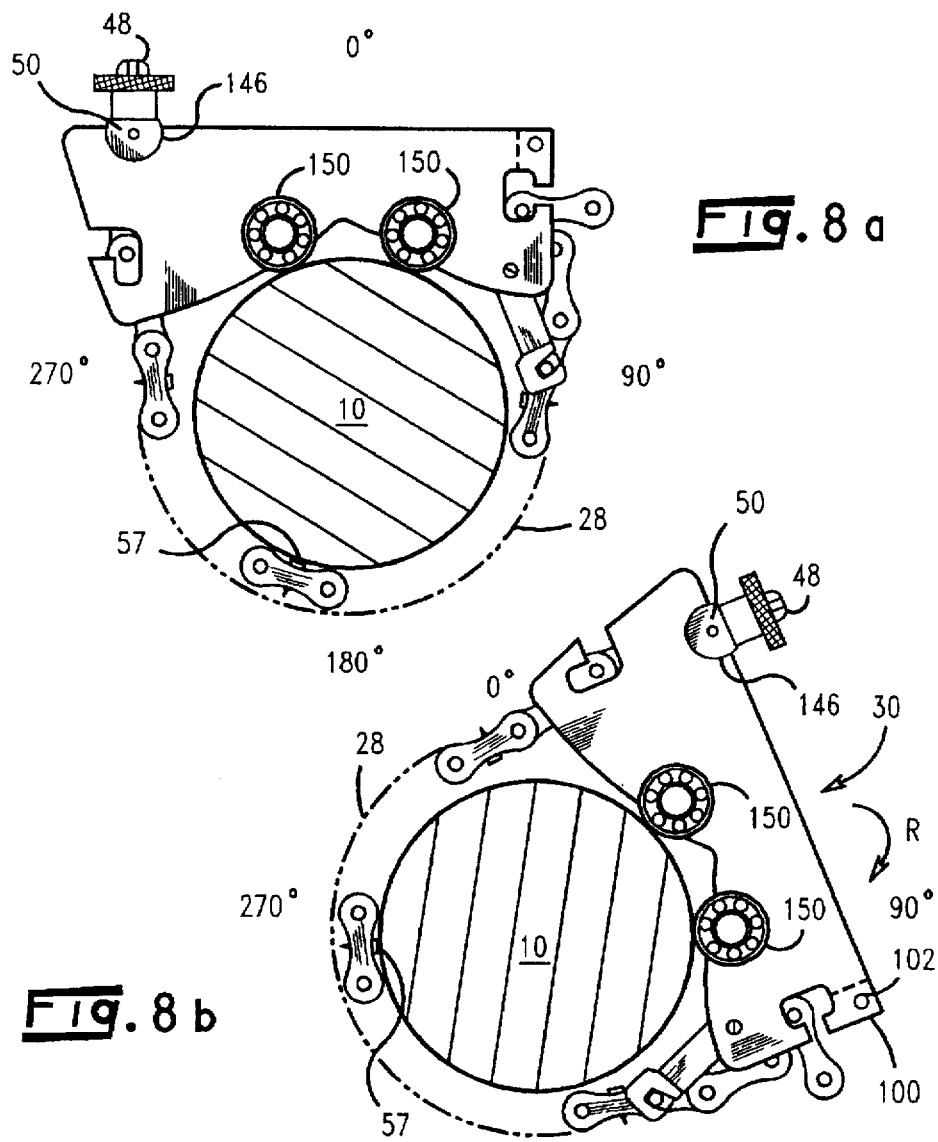
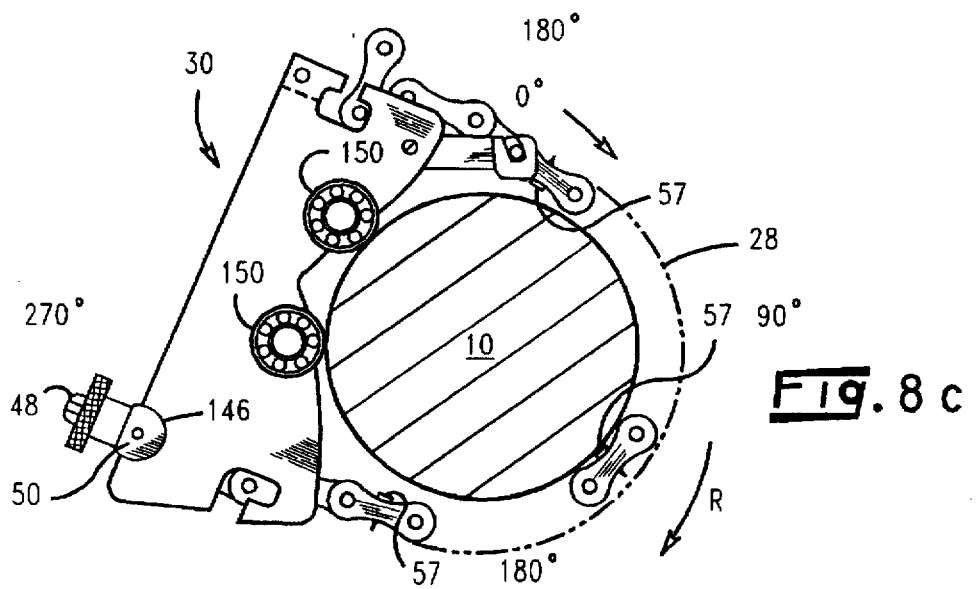

STATIONARY SHAFT ALIGNMENT APPARATUS

TECHNICAL FIELD

This invention relates generally to the art of aligning rotatable in-line machine shafts which are coupled together for operation by a shaft coupling. More particularly, the invention relates to systems and methods for acquisition of data from which the amount of misalignment may be determined, and from which machine moves to bring the shafts into alignment can be determined.

BACKGROUND OF THE INVENTION

As is well known, whenever two rotating machine shafts are coupled together, such as the shaft of an electric motor and the shaft of a pump, it is important that the shafts be aligned within predetermined tolerances. Such shafts, when in perfect alignment, have their extended center lines (axes of rotation) coinciding along a straight line. Misalignment can lead to vibration, excessive wear, and ultimate destruction of couplings, bearings, seals, gears and other components.

A number of shaft alignment methods are known, which generally have in common the use of suitable alignment fixtures, also termed alignment brackets. The alignment brackets are employed to measure particular relative displacements (also termed offsets) as the shafts typically are rotated together through one revolution, taking readings at various angular positions.

Because of disadvantages existing with respect to prior art alignment devices, there exists a need in the art for an improved shaft alignment system which is easier to set up and use and which reduces the error in measurement and other problems which inherently result from the design of prior art devices.

There is also a need in the art for a system and method for measuring relative shaft positions which avoids rotation of the shafts during the taking of measurements.

SUMMARY OF THE INVENTION

To address the foregoing and other problems and shortcomings with prior art alignment devices, the present invention provides a system for measuring misalignment between first and second stationary in-line shafts. The system includes a sensed point rotatably positionable around the first stationary shaft for rotation through a plurality of first angular positions about the first shaft, the sensed point being maintained at a substantially constant radial distance away from the centerline of the second stationary shaft during rotation; and a sensor for sensing the sensed point, the sensor being rotatably positionable around the first stationary shaft independently of the sensed point for rotation through a plurality of second angular positions about the first stationary shaft.

The sensor is maintained at a substantially constant radial distance away from the centerline of the first stationary shaft during rotation and the sensor is positionable for sensing the sensed point at a plurality of angular positions about the first stationary shaft and producing an output corresponding to radial distances along lines through the sensed point and perpendicular to the centerline of the first stationary shaft.

The present invention also provides a method for producing misalignment information as to centerlines of first and second in-line stationary shafts, which includes the steps of maintaining the shafts substantially stationary; rotating a sensed point through a plurality of first angular positions around the first shaft while maintaining the sensed point at a substantially constant radial distance away from the centerline of the second shaft; rotating a sensor through a plurality of second angular positions around the first shaft while maintaining the sensor at a substantially constant radial distance away from the centerline of the first shaft; coordinating the rotation of the sensed point and the sensor so that a plurality of the first angular positions correspond to a plurality of the second angular positions at corresponding times; sensing the sensed point with the sensor at a plurality of the corresponding angular positions around the first shaft; producing an output corresponding to radial distances along lines through the sensed point and perpendicular to the centerline of the first shaft when the sensed point is at each corresponding angular position; and producing information as to the misalignment of the centerlines of the shafts based upon the output at each corresponding angular position.

BRIEF DESCRIPTION OF THE DRAWINGS

The above and other features and advantages of the present invention will become further known from the following detailed description when considered in conjunction with the accompanying drawings in which:

FIG. 2 is a somewhat diagrammatical front elevational view of an embodiment of an alignment system for measuring relative displacement of rotatable in-line shafts;

FIG. 3 is a front elevational view showing the use of binary blocks with the alignment system of FIG. 2;

FIGS. 8a–8c are front elevational views showing rotation of the mounting base about a stationary shaft.

DETAILED DESCRIPTION

Figure 1:
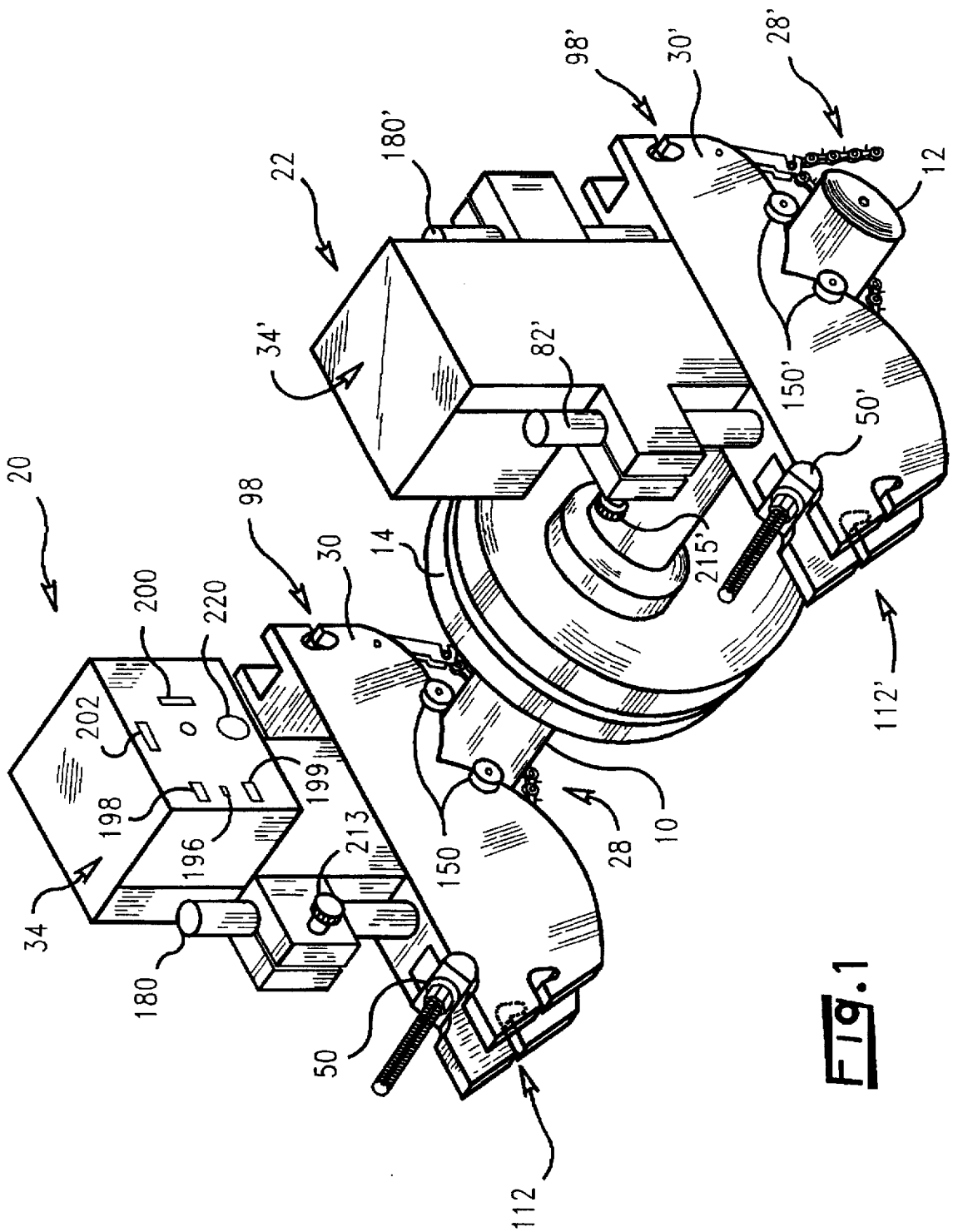
FIG. 1 depicts in overview the general environment of first and second stationary in-line shafts with alignment systems mounted thereon in accordance with a preferred embodiment of the present invention for measuring relative displacement at various angular positions.

With reference now to drawing FIGS. 1–9 in which like reference characters designate like or similar parts throughout the several views, there is shown a preferred embodiment of the present invention which advantageously enables the taking of misalignment information without rotation of the shafts.

With initial reference to FIG. 1, first and second in-line stationary shafts 10 and 12 are shown coupled to each other by means of a coupling 14. The shafts 10 and 12 are connected to respective machines (not shown) such as a motor driving a pump through the shafts and coupling 14. A first alignment system 20 and a second alignment system 22 are mounted on the shafts 10 and 12, respectively, and are movable relative to the shafts so that the degree of misalignment of the shafts may be obtained without rotating the shafts.

After information relevant to the degree of misalignment is measured, one of the machines is moved, as by loosening its mounting bolts, moving the machine in a horizontal plane, and/or inserting or removing shims under one or more machine feet, all as necessary, to bring the shafts 10 and 12 into an aligned condition.

With added reference now to FIGS. 2 and 3 the alignment system 20 includes a chain assembly 28, a mounting base 30 and a sensor assembly 34. In FIG. 3, a binary block system 32 (described in U.S. Pat. No. 5,371,953 issued Dec. 13, 1994, incorporated herein by reference in its entirety) is shown mounted on the base 30 and the sensor assembly 34 mounted on the binary block system 32. The alignment system 22 is identical to the alignment system 20 and reference numbers associated therewith will be indicated with a prime suffix.

Chain Assembly 28

Figure 4:
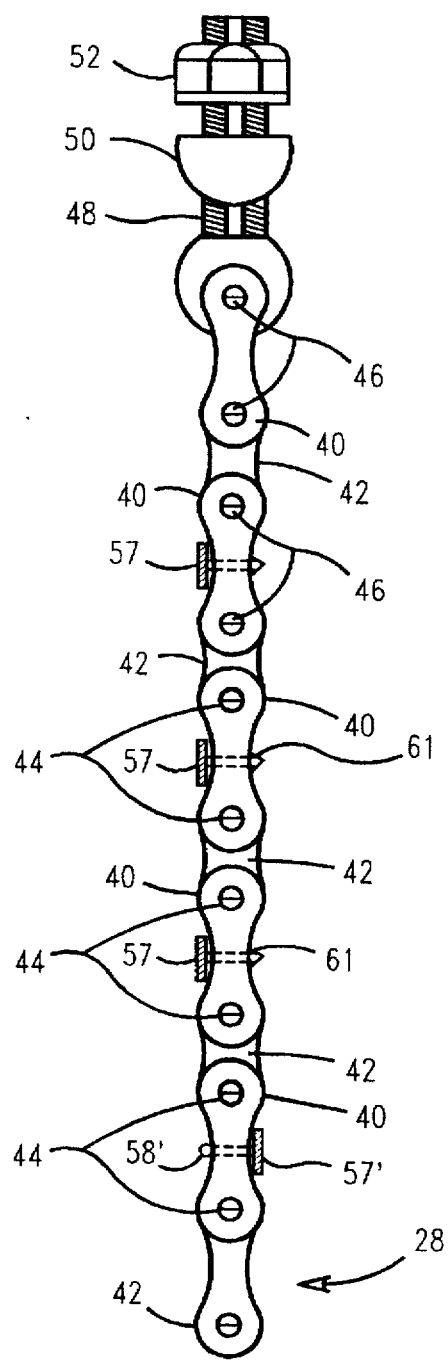
FIG. 4 is an elevational view of a chain assembly.
Figure 6A:
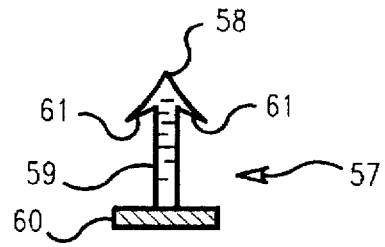
FIG. 6a is a front elevational view of a friction reducing slide used with the chain of FIG. 4
Figure 6B:
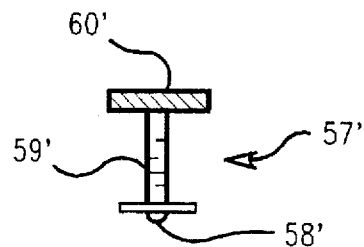
FIG. 6b is a front elevational view of another embodiment of a friction reducing slide provided by a pan-head screw and a nylon acorn nut.
Figure 5:
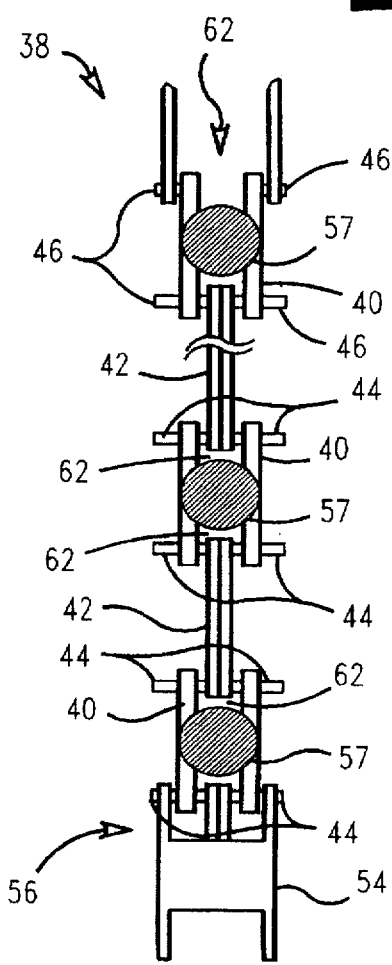
FIG. 5 is a top plan view of a section of a chain.

With reference to FIGS. 4, 5 and 6, the chain assembly 28 is similar to chain assembly 28 described in U.S. Pat. No. 5,371,953, incorporated herein by reference, and includes an elongate chain 38 having a plurality of interconnected outer links 40 and inner links 42 connected together by link pins 44 and 46, a tensioning bolt 48, a cylinder 50 and a nut 52. As can be seen, the link pins 46 are shorter than the link pins 44 so that they may be received within the mounting block 30 as described in U.S. Pat. No. 5,371,953 for the chain assembly 28 therein. A chain clip 54 similar to chain clip 54 described in U.S. Pat. No. 5,371,953 is preferably fittingly received onto one of the link pins 44 near a free end 56 of the chain.

As an additional feature, the chain assembly 28 preferably includes a plurality of low friction slides 57 or 57' (FIGS. 6a–6b) positioned thereon, as shown in FIGS. 4 and 5. Each slide 57 (FIG. 6a) preferably includes a point 58, a shank 59 and a head 60 and is preferably constructed of a polymer-based material having a relatively low coefficient of friction, such as nylon. Each slide 57' (FIG. 6b) is provided by a pan-head screw having a base 60' and a screw shaft 59' and a nylon acorn nut 58' threadably received on the screw shaft 59'.

Each slide 57 is inserted point first into a space 62 defined between the width of the chain between each pair of outer links 40. The point 58 and shank 59 of each slide 57 are preferably sized to be slightly larger than the space 62 so that when the point 58 and shank 59 are inserted through the space 62, the shank 59 presses against the sides of the outer links 40 and flared edges 61 of the point 58 extend above the space 62 to retain the slide 57 within the space 62 with the head 60 flush against the outer links 40. The slides 57' are installed by inserting the screw shaft 59' into space 62 and threading the nut 58' onto the screw shaft. Accordingly, it will be understood that when the chain assembly 28 is positioned around the shaft 10, the head 60 of the slide 57 (or the nut 58' of the slide 57') bears against the shaft 10 to provide a low friction surface to enable the chain 38 to slide relative to the shaft 10, as shown in FIGS. 8a–8c.

For example, with reference to FIG. 8a, the shaft 10 is stationary and the base 30 is shown positioned at about the 0° position; in FIG. 8b the base has been rotated relative to the stationary shaft 10 in the direction of the arrow R toward the 90° position; and in FIG. 8c the base has been rotated further in the direction of the arrow R toward the 270° position.

Mounting Base 30

Figure 7:
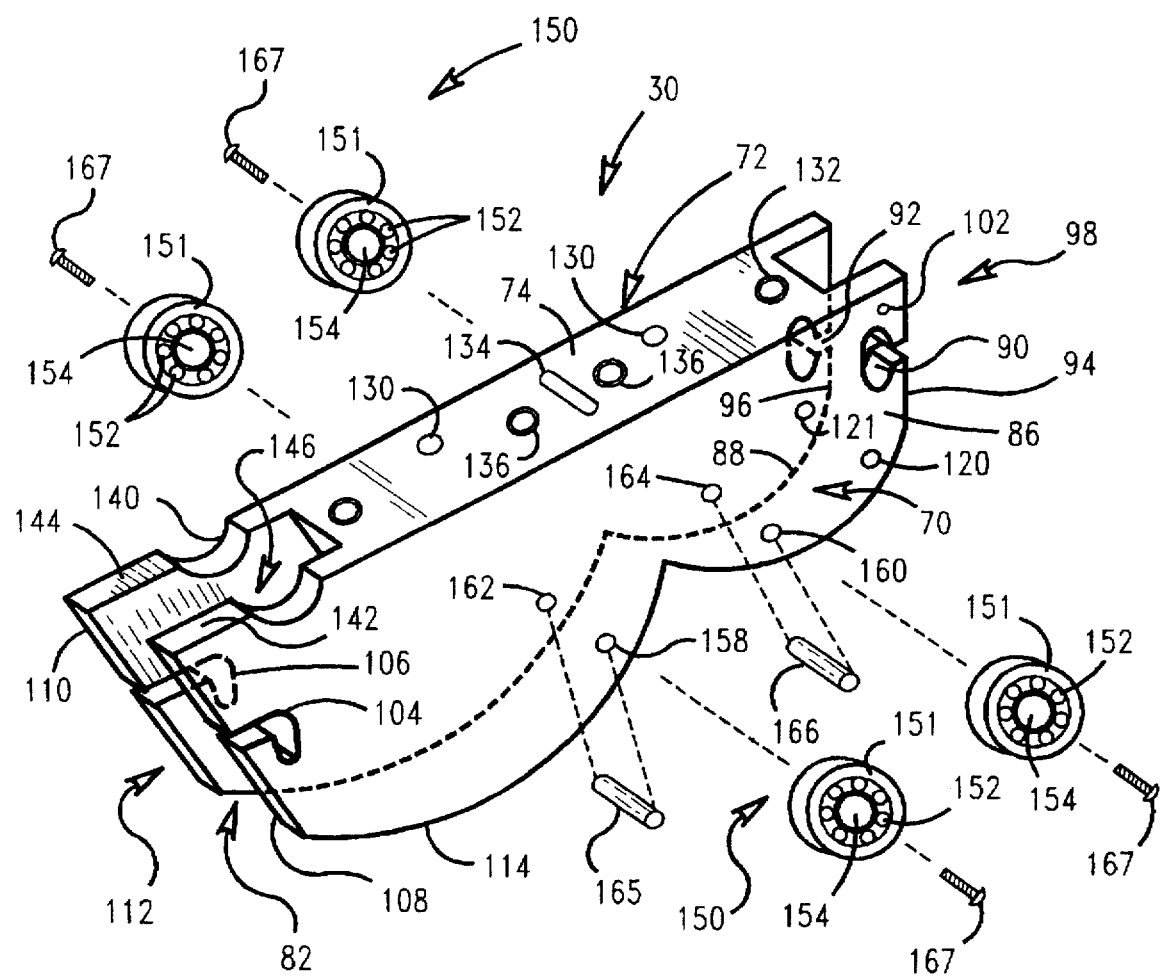
FIG. 7 is an exploded view showing a mounting base used with the alignment system of FIG. 2.

Returning to FIGS. 2 and 3 and with reference to FIG. 7, the mounting base 30 is similar in construction to the mounting base 30 shown in U.S. Pat. No. 5,371,953 and preferably is a unitary structure having a front surface 70, an identical rear surface 72, top surface 74, and an inner body 76 (shown in phantom in FIG. 3) located between the front and rear surfaces 70, 72 and opposite the top surface 74.

The front surface 70 is preferably parallel to and spaced apart from the rear surface 72, and a cavity 82 is preferably formed between the front and rear surfaces 70, 72 below the inner body 76. The front and rear surfaces 70, 72 are located in part on plates 86 and 88, and corresponding and aligned T-shaped cutouts 90, 92 may be provided on right side edges 94, 96 of the front and rear plates 86, 88, respectively, to provide a T-slot 98 sized to receive one of the link pins 44 of the chain 38. A rubber grip 100 (FIGS. 2 and 3) having a rectangular profile is preferably fittingly received and maintained between the surfaces 70 and 72 adjacent the T-slot 98 by a roll pin 102 (FIGS. 2 and 3) to engage the link 40 inserted therein to enable the link pin 44 of the link to be forced downwardly into the lower portion of the T-slot 98 and frictionally maintained within the T-slot 98.

Similarly, corresponding and aligned L-shaped cutouts 104, 106 are provided on left side edges 108, 110 of the front and rear plates 86, 88 respectively, to provide an L-slot 112 (FIG. 2) sized to receive one of the link pins 44 of the chain 38. Corresponding and aligned lower edges 114, 116 of the front and rear surfaces 70, 72, respectively, are preferably curved to enable the mounting base 30 to fit a variety of shaft sizes.

A pivot link 118 (FIG. 2) is pivotally secured within the cavity 82 between the front and rear plates 86, 88 by a hinge pin 119 that extends through apertures 120 and 121 (FIG. 7) in plates 86, 88, respectively, and an upper end 122 (shown in phantom in FIG. 2) of the pivot link 118. A hook 124 sized to receive one of the link pins 44 is preferably provided at the opposite end of the pivot link 118 and oriented so that open side 126 of the hook 124 faces away from the left side of the base 30. A wave washer 127 is preferably provided between each side of the link 118 and the cavity 82 to facilitate pivotal movement of the pivot link 118.

With particular reference to FIG. 7, threaded bores 132 may be provided on the top surface 74 for mounting of the sensor assembly 34. If a mechanical sensor head such as the sensor 180 described in U.S. Pat. No. 5,371,953 is used in place of the laser sensor head 184 described herein, it will be understood that a recessed slot 134 may also be provided on the top surface 74 to provide clearance for the operation of the sensor assembly 34. In addition, the binary block system 32 (described in U.S. Pat. No. 5,371,953) may be mounted on the mounting base 30 to provide clearance over the coupling 14. For example, the sensor assembly 34 may be mounted on the binary block system 32 (FIG. 3). To this end, smooth dowel bores 130 and threaded bores 136 are preferably provided on the top surface 74 for mounting of the block system 32 in a manner similar to that described in U.S. Pat. No. 5,371,953.

The cylinder 50 enables the chain 38 to be mounted to the mounting base 30. To this end, corresponding and aligned cylindrical cutouts 138, 140 are provided adjacent the top surface 74 on top edges 142, 144 of the front and rear plates 86, 80, respectively, to provide a cylindrical cradle 146 sized to receive the cylinder 50.

To facilitate smooth rotation of the mounting base 30 about the stationary shaft 10, a pair of rotator assemblies 150 are preferably provided on the base. Each rotator assembly 150 includes a pair of rotating members such as wheels 151. Each wheel 151 preferably includes a plurality of bearings, such as roller bearings 152, to facilitate the rotation thereof. In a particularly preferred embodiment, each wheel 151 is substantially circular in shape and includes an opening 154 extending through the central axis thereof to facilitate mounting of the wheels to the mounting block 30. Each wheel 151 is preferably coated or otherwise provided with rubber or other vibration damping material.

A pair of openings 158, 160 are preferably provided through the side 86 and a pair of corresponding openings 162 and 164 may be provided through the thickness of the opposite side 88 for mounting of the wheels 151. A pair of internally threaded cylinders 165, 166 may be positioned within the cavity 82 of the base 30 and aligned with the openings 158, 162 and 160, 164, respectively to facilitate attachment of the wheels 151 to the base. The rotator assemblies 150 may be mounted to the base 30 as by threading a screw 167 through the opening 154 in each wheel 151 and into the threaded cylinders 165, 166.

With additional reference to FIGS. 8a–8c, the mounting base 30 is shown mounted on the shaft 10 by the chain assembly 28 and rotated to various locations relative to the shaft. To mount the base 30, the tensioning bolt 48 to which the chain 38 is attached is passed through the cylinder 50 and the cylinder 50 positioned within the cradle 146. As mounted, the wheels 151 and the slides 57 are interposed against the shaft 10 so that the base 30 may be moved around the circumference shaft by exerting a relatively small force on the base. Preferably, the chain assembly is tensioned to bear the wheels 151 firmly against the shaft 10. If the wheels 151 are coated with rubber or other pliable material, it is desirable to tighten the chain assembly an amount sufficient to slightly compress the rubber.

Once the mounting base 30 is mounted to the shaft 10 with the chain assembly 28, the binary block system 32 or the sensor assembly 34 is mounted to the mounting base 30. Likewise, the base 30' and sensor 34' is mounted on the shaft 12 in a spaced apart and facing relationship to the base 30 and sensor 34. The oppositely facing sensor assemblies (one on each shaft) are then rotated or "swept" to obtain misalignment information, as will be explained more fully below.

Sensor Assembly 34

Figure 9:
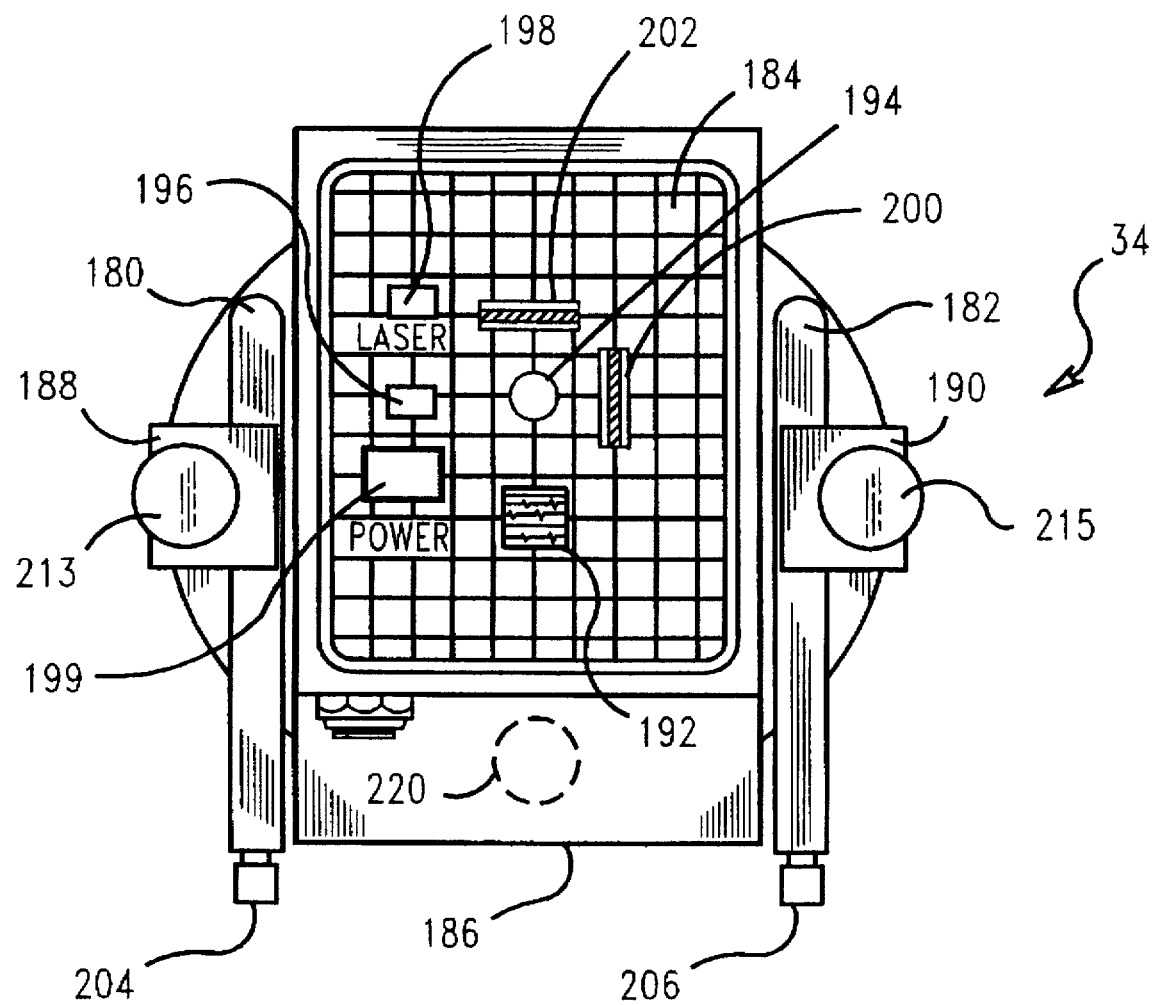
FIG. 9 is a front elevational view of a laser sensor assembly.

Turning now to FIG. 9 the sensor assembly 34 preferably includes vertical mounting posts 180, 182, sensor head 184, mounting brackets 188, 190, laser target port 192, laser exit port 194, sensor head light-emitting diodes (LEDS) 196 and 198, on/off switch 199, vertical laser adjustment control 200, and horizontal laser adjustment control 202.

The mounting posts 180 and 182 are preferably cylindrical, posts each having threaded ends 204 and 206, respectively, which are threadably received within the openings 132 on the top of the mounting base 30. To mount the sensor, the mounting posts are threaded into the openings 132 and the mounting brackets are slidably positioned over the mounting posts. Mounting screw 213 and 215 may then be used to secure the mounting brackets 188 and 190 against the posts 180 and 182, respectively.

The sensor head 184 is preferably powered by an internal battery source and provides a laser source which emits a laser beam from the sensor head through the laser exit port 194. Illumination of the LED 196 indicates that the sensor head is turned on and illumination of the LED 198 indicates activation of the laser beam. The laser exit port 194 enables a laser beam to be directed toward the opposite sensor head. Likewise, the laser target port 192 is provided with a sensor, such as a position sensitive detector ("PSD"), to sense the spot on which the laser from the opposite laser port is impinging on the sensor head and ambient light filters. The laser target port 192 thus will be understood to provide a sensor which determines a change in distance from the laser spot to the shaft, or at least the change in that radial distance. Horizontal laser adjustment control 200 and vertical laser adjustment control 202 permit adjustment of the direction of the laser beam so that the beam will be directed toward the target port of the opposite sensor for detection during the gathering of misalignment information.

A preferred sensor head is the ULTRASPEC® 8200 or 8210 Series laser system available from Computational Systems, Incorporated, the assignee of the present invention. Also, the sensor head preferably includes an internal inclinometer 220, such as the capacitance-type inclinometer available from Lucas Sensing Systems, to determine the angular position of the sensor head, i.e. 0°, 90°, 270°, 360°, so that manual determinations of these measurements need not be taken. The inclinometer preferably generates a signal corresponding to the angular position which is transmitted to an analyzer, as set forth below.

Operation of the Laser Alignment System

Referring again to FIG. 1, to measure the misalignment of the shafts 10, 12, the alignment systems 20, 22 are mounted on the shafts 10, 12. This is typically accomplished by first mounting the mounting base 30 of the system 20 in the manner described previously. The mounting base 30' of the system 22 is then mounted in a like manner so that the bases are at the same rotational position and the chains are secured so that they do not flop or otherwise bump the mounting bases 30, 30' or shafts 10, 12 during the taking of measurements. The spacing between the mounting bases 30, 30' is preferably selected to be as far apart as the machine environment permits. The direction of the lasers may be adjusted by use of the adjustment controls 200 and 202 so that each laser beam will be directed toward the target port of the opposite sensor. To gather misalignment information, the sensor assemblies are preferably rotated in the same direction around the shafts, and the changing position of the laser is noted as the sensor assemblies are rotated around the shafts. Optionally, the sensor assemblies may be rotated in opposite directions relative to one another. The changing radial positions of the laser beams indicate the misalignment of the shafts.

The measurement angular positions are not necessarily the 0°, 90°, 180° and 270° angular positions at which measurements are traditionally taken. Instead, one sensor assembly is preferably rotated through a plurality of positions and the other sensor assembly is "swept" past the same positions so that the two lasers sweep across the two sensor ports 192 of the two facing sensor heads 184. As the lasers sweep across the heads 184, the changing radial distance of the laser is obtained to provide information as to the misalignment of the centerlines of the shafts based upon the output at each corresponding angular position. Once collected, sine functions are preferably fit to the measurements in the manner described in U.S. Pat. No. 5,263,261 entitled "Shaft Alignment Data Acquisition", issued Nov. 23, 1994, incorporated herein by reference in its entirety.

For example, the PSD in the sensor head 184 generates a signal corresponding to the position of the sensed laser beam. This signal is digitally transmitted to a processor contained in the sensor head 184 to convert the sensed position into information related to the actual or relative position of the sensed beam. Assuming adequate space, one typically places both heads 184 on the 0° position and adjusts the position of each laser to the "zero" position of the opposing sensor port 192. Then the two heads 184 are rotated to 90°, 180°, and 270° (or other rotational positions) and, at each position, a signal is generated to indicate the amount and direction of movement of each laser relative to the zero positions of ports 192. This relative movement may then be used to determine offset and angularity of the two shafts 10 and 12. This information is then transmitted, as by infrared link or cable, to an analyzer for conversion of the misalignment information into information in terms of what adjustments, i.e., "machine moves", are necessary to align the shafts. Preferably, the angular position information from the inclinometer is also transmitted by infrared link or cable to the analyzer.

A preferred analyzer for use with the ULTRASPEC® 8200 series laser system is the ULTRASPEC® 8000 series alignment system also available from Computational Systems Incorporated. The ULTRASPEC® 8000 series alignment system is a menu driven analyzer which provides alignment information in terms of both offset and angle and provides digital readouts showing the direction and amount of each machine move.

As will be appreciated, the present invention enables information related to misalignment of the shafts to be collected without requiring movement or rotation of the shafts. This is advantageous to simplify the gathering of such information and to reduce error in measurement and other problems inherent in prior art devices.

The foregoing description of preferred embodiments of the present invention has been provided for purposes of illustration only, and it is understood that numerous modifications or alterations may be made without departing from the spirit and scope of the invention as defined in the following claims.

What is claimed is:

1. A method for producing misalignment information as to centerlines of first and second in-line stationary shafts, said method comprising:

maintaining the shafts substantially stationary;

rotating a sensed point through a plurality of first angular positions around the first shaft while maintaining the sensed point at a substantially constant radial distance away from the centerline of the second shaft;

rotating a sensor through a plurality of second angular positions around the first shaft while maintaining the sensor at a substantially constant radial distance away from the centerline of the first shaft;

coordinating the rotation of the sensed point and the sensor so that a plurality of the first angular positions correspond to a plurality of the second angular positions at corresponding times;

sensing the sensed point with the sensor at a plurality of the corresponding angular positions around the first shaft;

producing an output corresponding to radial distances along lines through the sensed point and perpendicular to the centerline of the first shaft when the sensed point is at each corresponding angular position; and producing information as to the misalignment of the centerlines of the shafts based upon the output at each corresponding angular position.

2. The method of claim 1, further comprising the steps of:

rotating a second sensed point through a plurality of third angular positions around the second shaft while maintaining the second sensed point at a substantially constant radial distance away from the centerline of the first shaft;

rotating a second sensor through a plurality of fourth angular positions around the second shaft while maintaining the second sensor at a substantially constant radial distance away from the centerline of the second shaft;

coordinating the rotation of the second sensed point and the second sensor so that a plurality of the third angular positions correspond to a plurality of the fourth angular positions at corresponding times;

sensing the second sensed point with the second sensor at a plurality of angular positions around the second shaft;

producing a second output corresponding to radial distances along lines through the second sensed point and perpendicular to the centerline of the second shaft when the second sensed point is at each corresponding angular position; and producing information as to the misalignment of the centerlines of the shafts based upon second output at each corresponding angular position.

3. The method of claim 1, wherein said step of rotating a sensed point comprises rotating a beam of light around the shafts to form a sensed point of light on the sensor.

4. The method of claim 1, wherein said step of producing an output corresponding to radial distances comprises producing an output corresponding to change in the radial distance between the sensed point and the centerline of the first shaft.

5. The method of claim 1, wherein said step of rotating a sensed point comprises rotating a laser around the shafts to form a sensed laser beam for sensing by the sensor and said step of rotating a sensor comprises rotating an optical sensor around the shafts to sense the laser beam.

6. A method for producing misalignment information as to centerlines of first and second in-line shafts, said method comprising:

maintaining the shafts substantially stationary;

rotating a first sensed point through a plurality of first angular positions around the first shaft while maintaining the first sensed point at a substantially constant radial distance away from the centerline of the second shaft;

rotating a first sensor through a plurality of second angular positions around the first shaft while maintaining the first sensor at a substantially constant radial distance away from the centerline of the first shaft;

rotating a second sensed point through a plurality of third angular positions around the second shaft while maintaining the second sensed point at a substantially constant radial distance away from the centerline of the first shaft;

rotating a second sensor through a plurality of fourth angular positions around the second shaft while maintaining the second sensor at a substantially constant radial distance away from the centerline of the second shaft;

coordinating the rotation of the first sensed point and the first sensor so that a plurality of the first angular positions correspond to a plurality of the second angular positions at corresponding times;

coordinating the rotation of the second sensed point and the second sensor so that a plurality of the third angular positions correspond to a plurality of the fourth angular positions at the corresponding times;

sensing the first sensed point with the first sensor at a plurality of corresponding angular positions around the first shaft;

sensing the second sensed point with the second sensor at a plurality of corresponding angular positions around the second shaft;

producing a first output corresponding to radial distances along lines through the first sensed point and perpendicular to the centerline of the first shaft when the first sensed point is at each corresponding angular position;

producing a second output corresponding to radial distances along lines through the second sensed point and perpendicular to the centerline of the second shaft when the second sensed point is at each corresponding angular position; and producing information as to the misalignment of the centerlines of the shafts based upon the first and second outputs at each corresponding angular position.

7. A system for measuring misalignment of centerlines of first and second in-line stationary shafts, said system comprising:

a sensed point rotatably positionable around the first stationary shaft for rotation through a plurality of first angular positions about the first shaft, said sensed point being maintained at a substantially constant radial distance away from the centerline of the second stationary shaft during rotation; and a sensor for sensing said sensed point, said sensor being rotatably positionable around the first stationary shaft independently of said sensed point for rotation through a plurality of second angular positions about the first stationary shaft, said sensor being maintained at a substantially constant radial distance away from the centerline of said first stationary shaft during rotation and said sensor being positionable for sensing the sensed point at a plurality of angular positions about the first stationary shaft and producing an output corresponding to radial distances along lines through the sensed point and perpendicular to the centerline of the first stationary shaft.

8. The system of claim 7, further comprising:

a second sensed point rotatably positionable around the second shaft for rotation through a plurality of third angular positions about the second shaft, said sensed point being maintained at a substantially constant radial distance away from the centerline of the first shaft during rotation; and a second sensor for sensing said second sensed point, said second sensor being rotatably positionable around the second shaft independently of said second sensed point for rotation through a plurality of fourth angular positions about the second shaft, said sensor being maintained at a substantially constant radial distance away from the centerline of said second shaft during rotation and said second sensor being positionable for sensing the second sensed point at a plurality of angular positions about the second shaft and producing a second output corresponding to radial distances along lines through the second sensed point and perpendicular to the centerline of the second shaft.

9. The system of claim 7, wherein said first sensed point comprises a laser beam producing a spot of light on said sensor.

10. The system of claim 7, wherein said sensor comprises an optical sensor.

11. A system for measuring misalignment of centerlines of first and second in-line stationary shafts, said system comprising:

a first rotatable base positionable on said first stationary shaft to extend substantially perpendicularly to the centerline of said first stationary shaft and to rotate about the centerline of said first stationary shaft, said first base having a first receiving surface configured to receive said first stationary shaft and a first mounting surface spaced apart from said first receiving surface;

first friction reducing elements positionable between said first stationary shaft and said first receiving surface for supporting said first rotatable base adjacent said first stationary shaft;

a fastener mechanically connected to the first rotatable base for engaging and fastening said first rotatable base to said first stationary shaft;

second friction reducing elements positionable between said first stationary shaft and said fastener;

a head extending from said first mounting surface perpendicularly to the first stationary shaft;

a laser for emitting a beam of light in a direction radially spaced apart from and substantially parallel to the centerline of said second stationary shaft;

an optical sensor located on said head for sensing the beam of light emitted from said laser and for producing a signal corresponding to the radial position of the beam of light at the optical sensor with respect to the centerline of the first stationary shaft.

12. The system of claim 11, wherein said fastener comprises:

an elongate chain having first and second ends and a mid-region defined between the first and second ends;

a chain attachment for attaching the first end of the chain to said first rotatable base;

a catch for securing the mid region of the chain to the first rotatable base; and a chain clip for clipping the second end of the chain to the mid-region of the chain.

13. The system of claim 11, wherein said first friction reducing elements comprise:

a first rotatable bearing mounted on the first receiving surface at a first support location for rotatably engaging said first stationary shaft; and a second rotatable bearing mounted on the first receiving surface at a second support location spaced apart from the first support location for rotatably engaging said first stationary shaft.

14. The system of claim 11, wherein said second friction reducing elements comprise a plurality of slides connected to the chain for slidably engaging the first stationary shaft.

15. The system of claim 11, further comprising:

a second rotatable base positionable on said second stationary shaft to extend substantially perpendicularly to the centerline of said second stationary shaft and to rotate about the centerline of said second stationary shaft, said second base having a second receiving surface configured to receive said second stationary shaft and a second mounting surface spaced apart from said second receiving surface;

third friction reducing elements positionable between said second stationary shaft and said second receiving surface for supporting said second rotatable base adjacent said second stationary shaft;

a second fastener mechanically connected to the second rotatable base for engaging and fastening said second rotatable base to said second stationary shaft;

fourth friction reducing elements positionable between said second stationary shaft and said second fastener;

a second head extending from said second mounting surface perpendicular to the second stationary shaft;

a second laser for emitting a second beam of light in a direction radially spaced apart from and substantially parallel to the centerline of said first stationary shaft;

a second optical sensor located on said second head for sensing the second beam of light emitted from said second laser and for producing a second signal corresponding to the radial distance between the second beam of light and the centerline of the second stationary shaft.

16. The system of claim 15, wherein said second laser is mounted on said first heads and said first laser is mounted on said second head.

17. A system for measuring misalignment of centerlines of first and second in-line stationary shafts, said system comprising:

a first rotatable base positionable on said first stationary shaft to extend substantially perpendicularly to the centerline of said first stationary shaft and to rotate about the centerline of said first stationary shaft, said first base having a first receiving surface configured to receive said first stationary shaft and a first mounting surface spaced apart from said first receiving surface;

a second rotatable base positionable on said second stationary shaft to extend substantially perpendicularly to the centerline of said second stationary shaft and to rotate about the centerline of said second stationary shaft, said second base having a second receiving surface configured to receive said second stationary shaft and a second mounting surface spaced apart from said second receiving surface;

a first fastener movably fastening said first base to said first stationary shaft for rotating around the first shaft in a plane perpendicular to the first shaft;

a second fastener movably fastening said second base to said second stationary shaft for rotating around the second shaft in a plane perpendicular to the second shaft;

a first laser for emitting a first beam of light in a direction radially spaced apart from and substantially parallel to the centerline of said second stationary shaft;

a second laser for emitting a second beam of light in a direction radially spaced apart from and substantially parallel to the centerline of said first stationary shaft;

a first optical sensor for sensing the first beam of light and for producing a signal corresponding to the radial position of the first beam of light at the first optical sensor with respect to the centerline of the first stationary shaft; and a second optical sensor located on said second head for sensing the second beam of light emitted from said second laser and for producing a second signal corresponding to the radial distance between the second beam of light and the centerline of the second stationary shaft.

* * * * *